(12) United States Patent
Ross et al.

(10) Patent No.: US 7,565,685 B2
(45) Date of Patent: Jul. 21, 2009

(54) OPERATING SYSTEM INDEPENDENT DATA MANAGEMENT

(75) Inventors: Alan D. Ross, Shingle Springs, CA (US); Dennis Morgan, Pine Grove, CA (US)

(73) Assignee: Intel Corporation, Santa Clara, CA (US)

( * ) Notice: Subject to any disclaimer, the term of this patent is extended or adjusted under 35 U.S.C. 154(b) by 492 days.

(21) Appl. No.: 11/271,292

(22) Filed: Nov. 12, 2005

(65) Prior Publication Data

US 2007/0113266 A1    May 17, 2007

(51) Int. Cl.
    *H04L 9/00* (2006.01)
(52) U.S. Cl. .............................. 726/1; 726/22; 713/168
(58) Field of Classification Search ................ 713/168; 726/1, 22; 707/9
    See application file for complete search history.

(56) References Cited

U.S. PATENT DOCUMENTS

| | | | |
|---|---|---|---|
| 5,511,159 A | | 4/1996 | Baker et al. |
| 5,850,516 A | | 12/1998 | Schneier |
| 5,901,228 A | * | 5/1999 | Crawford ..................... 705/34 |
| 6,493,698 B1 | | 12/2002 | Beylin |
| 6,802,022 B1 | * | 10/2004 | Olson ............................ 714/6 |
| 6,842,823 B1 | * | 1/2005 | Olson ......................... 711/129 |
| 7,080,051 B1 | * | 7/2006 | Crawford ..................... 705/400 |
| 2001/0032300 A1 | * | 10/2001 | Olson ......................... 711/162 |
| 2002/0065885 A1 | * | 5/2002 | Buonanno et al. ........... 709/205 |
| 2002/0102545 A1 | | 8/2002 | Shibuya |
| 2002/0112089 A1 | * | 8/2002 | Zargham et al. ............ 709/317 |
| 2002/0184537 A1 | | 12/2002 | Inokuchi et al. |
| 2004/0117568 A1 | * | 6/2004 | Zimmer et al. ............... 711/154 |
| 2004/0210906 A1 | | 10/2004 | Beresnevichiene et al. |
| 2005/0135351 A1 | | 6/2005 | Durham et al. |
| 2005/0135380 A1 | | 6/2005 | Durham et al. |
| 2005/0216577 A1 | | 9/2005 | Rozas et al. |
| 2005/0229246 A1 | | 10/2005 | Parmar et al. |
| 2005/0246771 A1 | * | 11/2005 | Hunt et al. .................... 726/18 |
| 2005/0278499 A1 | | 12/2005 | Smith et al. |
| 2006/0072451 A1 | | 4/2006 | Ross |
| 2006/0075481 A1 | | 4/2006 | Gutman et al. |
| 2006/0150248 A1 | * | 7/2006 | Ross et al. ..................... 726/22 |
| 2006/0156398 A1 | * | 7/2006 | Ross et al. ..................... 726/22 |
| 2006/0179441 A1 | * | 8/2006 | Sigurdsson et al. ......... 719/330 |
| 2007/0043667 A1 | * | 2/2007 | Qawami et al. ............... 705/50 |
| 2007/0112772 A1 | * | 5/2007 | Morgan et al. ................. 707/9 |

OTHER PUBLICATIONS

PCT International Search Report and Written Opinion, PCT Application No. PCT/US2004/042754, filed Dec. 17, 2004, 12 pages.
Mark Nelson, "Fast String Searching With Suffix Trees", *Dr. Dobb's Journal*, Aug. 1996, 9 pages, XP-002323499. (Best available copy).

(Continued)

*Primary Examiner*—Kambiz Zand
*Assistant Examiner*—Hadi Armouche
(74) *Attorney, Agent, or Firm*—Blakely, Sokoloff, Taylor & Zafman LLP (57) ABSTRACT

Apparatuses and methods provide operating system independent digital rights management. A request can be made for data, which can be monitored by a security module. The security module is independent of a host operating system and manages digital rights for the requested data. Thus, digital rights management occurs outside the context of a host operating system. The security module may classify the data and determine a security policy based on the data classification. Policy may be stored locally or remotely, and may be associated with the data subject to the policy.

19 Claims, 7 Drawing Sheets

OTHER PUBLICATIONS

James A. Storer, "Lossless Image Compression Using Generalized LZ1-Type Methods", *Proceedings of the Sixth Data Compression Conference*, IEEE Computer Society, Mar. 31-Apr. 3, 1996, Snowbird, Utah, p. 290-299.

Int'l Application No. PCT/US2006/043642 filed Nov. 9, 2006; Int'l search report & written opinion dated May 15, 2007.

Chinese Application No. 200610064247.5 Office Action mailed May 9, 2008.

Int'l Preliminary Report on Patentability (Chapter 1) mailed May 22, 2008 for Int'l Application No. PCT/US2006/043642.

International Search Report and Written Opinion mailed Jun. 13, 2008 for International Application No. PCT/US06/43642.

\* cited by examiner

OPERATING SYSTEM INDEPENDENT DATA MANAGEMENT

FIELD

Embodiments of the invention relate to security of computing devices, and more particularly to enterprise digital rights management.

BACKGROUND

Enterprises today face challenges to protection of intellectual property (IP) rights on data created and/or operated on within the enterprise. Employees may not be very savvy about the interests of the enterprise regarding the goals of IP rights regarding particular data, nor about how to classify the data they generate or work with. Sometimes an enterprise issues directives regarding protection of IP rights in data, but the directives are only valid to the extent the employees follow the directives. Many enterprises have found out too late that proper procedure is not regularly followed.

Digital rights management (DRM) exists, but is traditionally limited in scope to the protection of compact disks (CDs) or multi-media. Also, to the extent that DRM may be applied to other data within a computing device, traditional DRM technologies rely exclusively on the operating system to control access to data. In an enterprise, users may be administrators of their own computing devices, and have permissions within the operating system to create, modify, and distribute IP without any security controls.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

A computing device includes a hardware platform that can include a security module to provide data security management. The security of data can thus be isolated from a host operating system and resident applications. One example of a security module includes a module employing AMT (ACTIVE MANAGEMENT TECHNOLOGY) available from INTEL CORPORATION of Santa Clara, Calif. As requests for data are generated on the platform, the security module can monitor the requests and manage security issues associated with or implicated by the requests. Thus, requests can be generated from within a host operating system on the platform to a data management system, and the security module can ensure application and enforcement of digital rights management (DRM) of the data. As used herein, a request is to be understood as an exchange in either direction of data between a memory and a storage. A memory refers generally to volatile system memory, and a storage refers to a non-volatile storage. A request also refers to access or calling of data by a processor or central processing unit (CPU) from a memory (e.g., cache, random access memory (RAM)). Data refers to a grouping of one or more bits of information. DRM as used herein refers generally to the management of security and potentially access/modification/creation restrictions on any data. In more specifics, DRM may refer to a policy service in an enterprise that controls one or more of data classification, authentication (of a user), authorization to use data, and non-repudiation (attestation of a user's identity, e.g., via a digital certificate).

The security module on the platform is independent of one or more operating systems on the platform. As used herein, operating system independent refers to the concept that the operating system generally will not detect or have the ability to directly access the security module. A security module that is independent of the operating system is not subject to the same vulnerability of attack as the operating system. Thus, if the operating system is compromised or attacked, the integrity of the security module should remain unaffected. Besides being referred to as operating system independent, such a system may be referred to as "out of band," logically "below" the operating system, or by other terms that imply the concept that the security module does not generally require hardware or software controlled/managed by the operating system to exist. However, the functions of the security module may implicate hardware/software controlled by the operating system.

In one embodiment, an application exists within the operating system, or executes under the operating system, which interfaces with the security module. An application that executes under the operating system refers to a program that is managed/scheduled by the operating system. The application can exist within the operating system, for example, as a security kernel or other system application or native component of the operating system. The application communicates with the security module to provide information about data or a program with which data is accessible. In one embodiment, the application provides information to enable the security module to classify data.

As or after a request is made from the storage to load data into memory, or from memory to replace all or part of data, or to store newly created data in the storage, the security module can monitor the action with respect to the data. As or after a request is made with respect to an action on data (e.g., loading, accessing, creating) in a memory by a platform processor, the security module can monitor the action. Monitoring the action in any of these cases may include determining a type of the data, a security policy associated with the data, or that should be associated with the data, and ensuring that proper security policy rules or procedures are being correctly executed.

In one embodiment, the security module places mandatory access controls on selected newly created data. The selection of data on which to place mandatory access controls can be directed by a determination of data type, a geographic location of the platform (e.g., at a particular corporate facility, within a particular location of a corporate facility, off site), a virtual location of the platform (e.g., within a particular local area network (LAN) or virtual LAN (VLAN), on a particular wireless LAN (WLAN), on an unsecured network), a file type (e.g., specified by a particular file extension), a document type (e.g., specified by one of one or more particular file extensions, created from a particular template, data copied or duplicated from other data of a particular type), a purpose of the data (e.g., a presentation, code, an internal document), an identity of the user (e.g., a user name or password combination, any digital certificate, a particular digital certificate, a media access control (MAC) address), a length of an encryption key used to encrypt the data (e.g., 128-bit or higher, 256-bit or higher), having particular key words (e.g., a project codename), etc. Any of the previous may be considered to refer herein to a "data type." In one embodiment, all newly created data has mandatory access controls associated with it. Note that the mandatory access controls can be applied to the data regardless of the permissions that the creator of the data has within the operating system. Thus, a user may generate data on her/his computing device and the security module can associate security rules with the document without any need for the user to understand the security rules or attempt to trigger the security rules.

In one embodiment, the association of security rules with data refers to association of a specific policy for the specific data. In another embodiment, the association of security rules refers to association of a default security policy for the data. The same default security policy could be used, or a different default policy can exist depending on data type. Not only can the security association by the security module reduce the likelihood of accidental or malicious modification of data, but also may increase compliance with government and regulatory standards (e.g. the Sarbanes-Oxley (SOX) Act of 2002, H.R. 3763).

Figure 1:
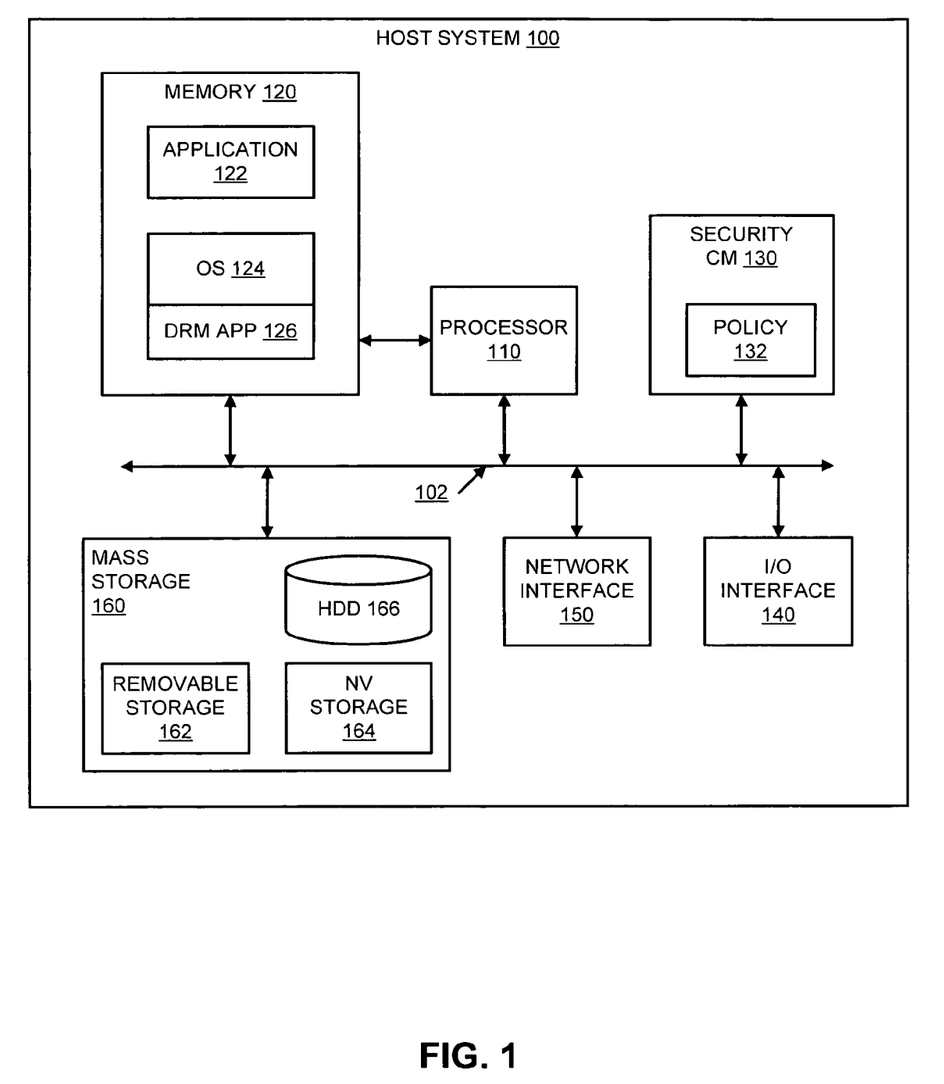
FIG. 1 is a block diagram of an embodiment of a system with a security capability manager.

FIG. 1 is a block diagram of an embodiment of a system with a security capability manager. Host system 100 represents an electronic system or computing system. For example, host system 100 can be a mobile computing device or mobile computing platform. Mobile computing devices may include laptop computers, handheld computing systems, personal digital assistants (PDAs), smart phones, etc. Host system 100 may also be a desktop computer, a server-type computer, or a workstation. Host system 100 includes bus or bus system 102. Bus 102 is understood to be any number of lines, components, bridges, etc., to provide interconnectivity among multiple platform components. Bus 102 may include one or more multi-drop and/or single drop communication paths. Bus 102 represents one mechanism for coupling components with one another. Other forms of interconnection or coupling could be used. As used herein, coupled does not necessarily mean physically connected, although it may. Coupled or interconnected could mean physical connectivity, communicative coupling, and/or electrical coupling.

Processor 110 represents one or more computing elements of host system 100. Processor 110 can be any type of computing element, and may include one or more central processing units (CPUs), processing cores, digital signal processors (DSPs), programmable logic devices (PLDs), microcontrollers, etc., or some combination of these. Processor 110 generally provides computing resources to host system 100, and executes the main operations of host system 100. Processor 110 provides a hardware environment on which to execute a host operating system. Host system 100 also includes memory 120, which may include one or more components of random access memory (RAM), including dynamic RAM (DRAM), synchronous DRAM (SDRAM), dual data rate RAM (DDR RAM), etc., or some combination of these. Memory 120 may also be understood as including one or more elements of cache. In general memory 120 provides temporary storage to provide instructions and data for processor 110 to compute/execute. Memory 120 can provide a resource into which to load programs to be executed on host system 100. Among other data or instructions stored in memory 120, memory 120 can include one or more applications 122 and an operating system (OS) 124. OS 124 is a main component of a software computing environment of host system 100.

In one embodiment, memory 120 also includes digital rights management (DRM) application 126, which represents one or more software components that interfaces OS 124 with security capability manager 130. DRM application 126 may be a native component of OS 124, or may exist as a separate application, function, dynamic linked library (DLL), etc. DRM application 126 provides communication between OS 124 and security capability manager 130. for example, DRM application 126 may provide information to security capability manager 130 regarding data and/or receive information from security capability manager 130 regarding security to apply to data.

Host system 100 also include one or more input/output (I/O) interfaces 140, which represent one or more components to provide interactivity with a user and/or interconnection with peripheral components and devices of host system 100. Host system 100 may include one or more network interfaces 150, which may be wired and/or wireless. Network interface 150 represents both hardware components (e.g., interface circuits, interface ports, controllers) as well as software components to run the hardware components (e.g., drivers), for either or both of wired or wireless interfaces.

Host system 100 includes mass storage 160, which represents one or more components to store data and/or programs in a non-volatile manner. Non-volatile storage is storage that maintains its information even if power is removed to the storage device. Thus, mass storage 160 may include one or more removable storage devices 162 (e.g., optical/magnetic disk drives), non-volatile storage 164 (e.g., flash or other semiconductor-based storage system, including universal serial bus (USB) storage compatibility), or magnetic hard disk drives (HDD) 166, or some combination of these.

In one embodiment, host system 100 includes security capability manager 130 to monitor and/or manage security for data in host system 100. Security capability manager 130 represents a security module according to any embodiment discussed herein. Security capability manager 130 includes policy 132, which represents either one or more security policies stored locally to security capability manager 130 or one or more security policies obtained remotely from host system 100 (e.g., over network interface 150), or some combination. Policy 132 provides rules related to the access, use, and/or dissemination of data with which policy 132 is associated. Security capability manager 130 is independent of OS 124, and provides management of security policy that is abstracted away from the context of the host operating system of host system 100.

Figure 2:
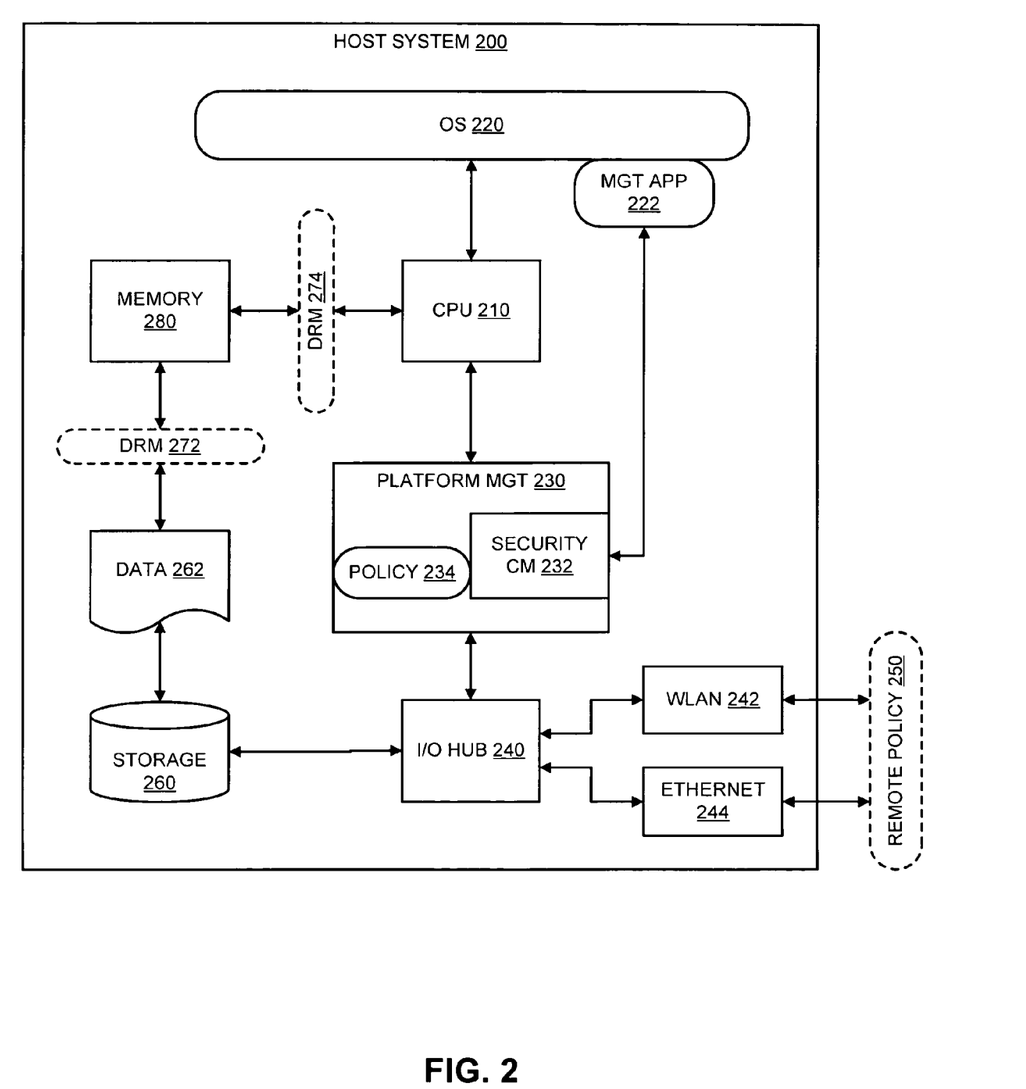
FIG. 2 is a block diagram of an embodiment of a system with a security capability manager to decide and apply digital rights management policy.

FIG. 2 is a block diagram of an embodiment of a system with a security capability manager to decide and apply digital rights management policy. Host system 200 is an example of a host system or a platform according to any embodiment described herein. Host system 200 includes CPU 210, which represents a processor to execute instructions on host system 200. CPU 210 may include one or more devices and/or processing cores. OS 220 is a host operating system of system 200, and executes on CPU 210. In one embodiment, host system 200 includes platform management 230, which may be built upon concepts of AMT.

Platform management 230 is independent of OS 220, and typically has control and/or processing logic separate from CPU 210. In one embodiment, platform management 230 resides on a memory controller hub. Platform management 230 includes security capability manager (CM) 232 and policy 234. Policy 234 may be local policy, or may be obtained from a remote device that includes remote policy 250. Remote policy 250 could be from a network policy server. Policy 234 represents rules or conditions that are or will be associated with data 262. Associating policy 234 with data 262 refers to making policy 234 applicable to data 262, or restricting the access or use of data 262 to be in compliance with policy 234. Data 262 becomes subject to associated policy 234. Associating policy 234 may include adding metadata or additional information to data 262 to indicate the specifics of policy 234, or to indicate where to access policy 234. In one embodiment, policy 234 includes an extensible markup language (XML) document/file saved with or otherwise associated with a main file/document of data 262.

Security capability manager 232 represents a security module or security manager according to any embodiment disclosed herein. Security capability manager 232 manages policy 234 to be applied to data 262. Managing policy 234 refers to the functions of security capability manager 232 to associate policy 234 to the data, determine if the policy is followed, and/or enforce a breach of the policy, or any other function related to policy decision or policy enforcement. Access to data 262 may be denied or restricted according to enforcement of policy 234.

In one embodiment, management application 222 is associated with OS 220, either as a native component of OS 220, or as a separate application operating under OS 220. Security capability manager 232 may be coupled to application 222 to interface with application 222 regarding security of data requested under OS 220. Generally, a request for data 262 will be made within the context of OS 220 (e.g., by OS 220, by an application running on the environment of OS 220), and security capability manager 232 will enforce a security policy for the data. The interface of security capability manager 232 may be direct as depicted in FIG. 2, or it may be through one or more other components, for example, CPU 210.

Platform management 230 is coupled to input/output (I/O) hub 240, which represents one or more components to provide peripheral support for host system 200. For example, one or more network connectivity mechanisms may be available in host system 200. I/O hub 240 is coupled to wireless LAN (WLAN) 242, which represents a wireless network interface circuit, and to Ethernet 244, which is an example of a wired network interface circuit.

I/O hub 240 may also be coupled to storage 260, which can be any type of non-volatile storage device. Although storage 260 is depicted in FIG. 2 within host system 200, storage 260 is not limited to residing within host system 200. In one embodiment, storage 260 resides external to host system 200, remotely over a network, and may be accessible, for example, via WLAN 242 and/or Ethernet 244. Storage 260 provides a location in which data 262 may be stored. Thus, data 262 may be data that is local to host system 200 and/or shared data on a network. Also note that data 262 is depicted between storage 260 and memory 280 in FIG. 2. Such a depiction of data 262 in this location is to be understood as merely representative as a single snapshot of host system 200, and data 262 may be within storage 260, within memory 280, being executed on CPU 210, within a cache, etc. "Movement" of data 262 between these various locations may be controlled by DRM 272 and/or DRM 274. DRM 272 and DRM 274 may or may not be based on separate digital rights rules. In one embodiment DRM 272 and DRM 274 are applications of policy 234 at different action on data 262. As used herein, "movement" or "action" on data 262 refers to one or more operations on one or more bits of data 262. Thus, loading, saving, modifying, changing, reading, sending, printing, etc., all refer to operations that may occur on data 262 that may be considered to be "movement" or "action" on data 262. DRM may be checked when one or more of the actions is requested on data 262, and policy 234 may apply restrictions or limitations with respect to one or more of the actions.

Generally, creation of data 262, modification of data 262, access of data 262, transmission of data 262, etc., may all be requests made with respect to data 262 that are subject to policy 234, with policy 234 managed/administered/controlled by security capability manager 232. The requests are made in the context of OS 220, and rather than having security administered by OS 220 or a component within the context of OS 220 (e.g., running under OS 220), security is administered by operating system independent components (e.g., security capability manager 232) of platform management 230. Security capability manager 232 can be a policy enforcement point local to host system 200 with respect to policy 234 because security capability manager 232 applies policy 234 to data 262. In one embodiment, security capability manager 232 can also generate policy 234 and/or obtain policy 234 from remote/external policy 250, and make decisions about the correct application of the policy on data 262 (e.g., what rules to associate with data 262, whether a particular user is authorized to access the data, what rules to apply to one or more users, etc.). Thus, security capability manager 232 may also be a policy decision point residing on host system 200.

Figure 3:
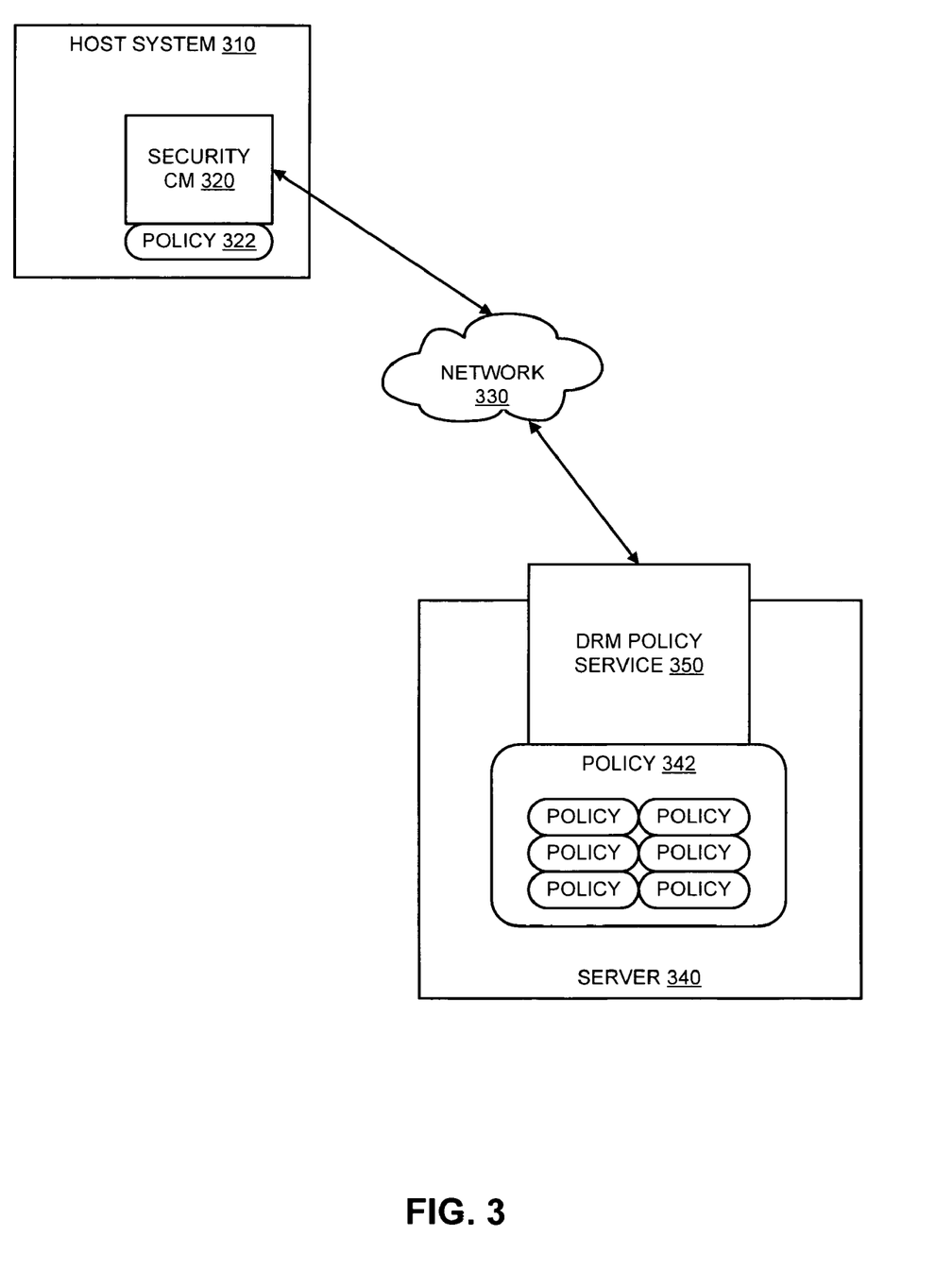
FIG. 3 is a block diagram of an embodiment of a system with a security capability manager coupled to a remote policy server.

FIG. 3 is a block diagram of an embodiment of a system with a security capability manager coupled to a remote policy server. Host system 310 represents a system or platform according to any embodiment described herein, with security capability manager 320, which represents a security module or capability manager according to any embodiment described herein. Security capability manager 320 manages and applies policy 322 to data within host system 310, in any manner described herein. Security capability manager 320 may be coupled to network 330 either directly or indirectly. The coupling of security capability manager 320 may be over generally available network ports/resources of a network interface circuit, as well, or in the alternative, to being an out-of-band communication link. An out-of-band communication link refers to a communication channel/line that is inaccessible to a host operating system of host system 310.

Network 330 provides a connection for security capability manager 320 to interface with server 340 and/or DRM policy service 350. Server 340 represents a server-class computing device or a computing device with network administrative services. DRM policy service may be a service of server 340, or accessed by server 340 from another location on network 330 or another network (not shown). DRM policy service 350 is an entity remote from host system 300 that provides policy to security capability manager 320 to implement on data of host system 300. DRM policy service 350 may access policy 342 with various rules or policies. The policies may be different based on a data type for which security capability manager 320 is implementing security. Policy 342 represents remote policy that may be available to security capability manager 320. In addition to creating security policy locally, in one embodiment, security capability manager 320 may be able to access policy 342 and store some or all policy locally as policy 322 to enable security capability manager 320 to act as a policy decision point.

Figure 4:
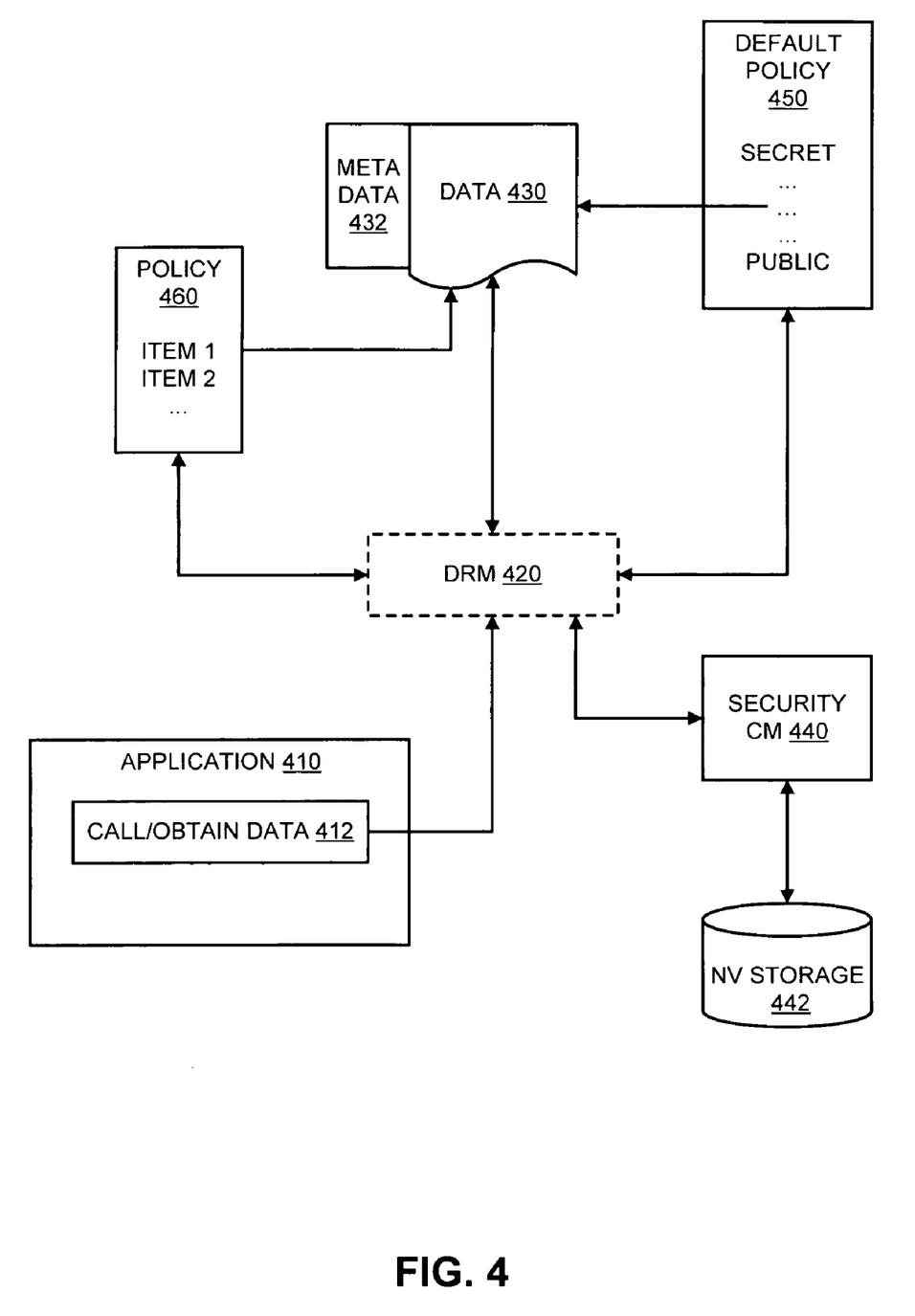
FIG. 4 is a block diagram of an embodiment of an application to access data according to a policy managed by a security capability manager.

FIG. 4 is a block diagram of an embodiment of an application to access data according to a policy managed by a security capability manager. Application 410 represents a program or application on a host system, typically within the context of a host operating system, which generates a request for data. Application 410 may include routine 412 to call/obtain data. The call for data may be to access or modify data. The calling or obtaining of data may also represent a request to the host operating system to allocate resources to manage one or more bits as a new data element (e.g., a file, a document). Routine 412 is subject to application of DRM 420 in the case of some or all data. Data that is sensitive, shared across a network, related to particular users, projects, and/or other data, etc., may have associated security that is managed by security capability manager 440.

In one embodiment, security capability manager 440 includes or has access to non-volatile (nv) storage 442, which represents one or more forms of persistent storage. In one embodiment, non-volatile storage 442 is exclusive to security capability manager 440, and no other entities can access non-volatile storage 442. In one embodiment, non-volatile storage 442 is or includes a Trusted Platform Module (TPM) of the TRUSTED COMPUTING GROUP. Thus, when as a TPM or other storage device, non-volatile storage 442 can be a secure or isolated memory. Non-volatile storage 442 can be secure or isolated simply if other components are not allowed access to the storage. Non-volatile storage 442 may be out-of-band if the components of the hardware platform available to the host operating system (e.g., a CPU, main system memory, a hard drive, etc.) are unable to directly access the storage. Security capability manager 440 can store, for example, policy or digital signatures on non-volatile storage 442. Security capability manager 440 may also store data in volatile memory. Policy could be obtained each time it is needed rather than stored locally in a non-volatile memory. In one embodiment, policy is selectively stored in non-volatile storage 442. For example, data of a particular level of security or higher may be required to always obtain policy from a network. Or conversely, data of a particular level of security or higher may always be stored in non-volatile storage 442. Also, security policy of particular data types may always be stored in non-volatile storage 442. Thus, information can be selectively stored within non-volatile storage 442.

Data 430 represents data as described herein for which routine 412 is making a request. Metadata 432 is associated with data 430 to provide information regarding the security policy of data 430. In one embodiment, metadata 432 is an XML file having the rules to apply to data 430. Policy 460 represents the policy associated with data 430. Policy 460 may include one or more items or provisions regarding permissions or use cases for data 430. Policy 460, as explained, can reside within metadata 432, be pointed to by metadata 432, or exist independently of metadata 432.

In one embodiment, default policy 450 is applied at creation to new data. Default policy 450 can also be associated with data 430 at time of modification, for example, if security capability manager 440 determines that no security policy exists for data 430. Data 430 can be defaulted to one of multiple levels of security, depending on the numerous factors described herein generically as "data type." For example, a corporation may have levels of security policy ranging from secret, which provides the most stringent controls of data 430, to public, which may apply little to no security rules to data 430. Default policy 450 can be set to one of the levels that will be applied to all data if the data does not already have a security policy. Alternatively, default policy 450 can determine a level corresponding to a data type. Thus, data in particular geographic locations may be given more stringent policy rules than what is given data from a different geographic location. Thus, just as implementation and/or enforcement of data security policy may be related to a data type, a default policy may be based on a data type.

Figure 5:
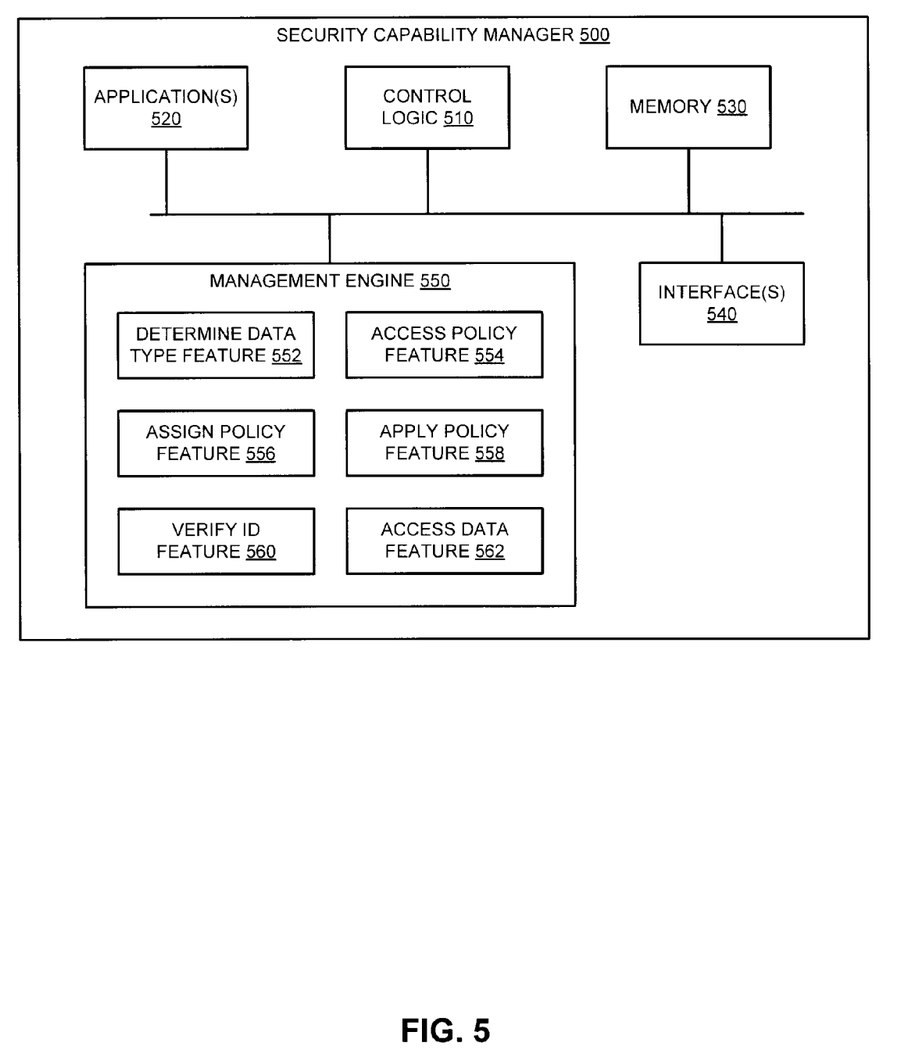
FIG. 5 is a block diagram of an embodiment of a security capability manager.

FIG. 5 is a block diagram of an embodiment of a security capability manager. The security capability manager of FIG. 5 is an example of a security capability manager according to any embodiment described herein. Manager 500 includes control logic 510, which implements logical functional control to direct operation of manager 500, and/or hardware associated with directing operation of manager 500. Logic may be hardware logic circuits and/or software routines. In one embodiment, manager 500 includes one or more applications 520, which represent code sequence and/or programs that provide instructions to control logic 510. Manager 500 includes memory 530 and/or access to memory resource 530 for storing data and/or instructions. Memory 530 may include memory local to manager 500, as well as, or alternatively, including memory of the host system on which manager 500 resides. Manager 500 also includes one or more interfaces 540, which represent access interfaces to/from manager 500 with regard to entities (electronic or human) external to manager 500. Interfaces 540 may include interfaces from manager 500 to other components of a host system on which manager 500 resides, as well as interfaces to entities external to the host system.

Manager 500 also includes management engine 550, which represents one or more functions that enable manager 500 to provide management of security policy. The functions include, or are provided by, one or more of determine data type feature 552, access policy feature 554, assign policy feature 556, apply policy feature 558, verify ID feature 560, and access data feature 562. Other features may be included, making other versions of management engine 550 that are more or less complex than what is shown. As used herein, feature may refer to a function, a module, a routine, a subsystem, etc., whether hardware, software, or some combination. Thus, "feature" should be interpreted in an illustrative, and not a restrictive sense. Each feature could be a module within manager 500.

Determine data type feature 552 enables management engine 550 to determine a type of data for security policy management purposes, as discussed in detail previously. General categories may be used to define a user attribute, a location of a host system, a data function, etc. The data type may be accessible to management engine 550, which could simply obtain the information from a memory manager, for example. Alternatively, management engine 550 may process a request for the data to determine the type of the data.

Access policy feature 554 enables management engine 550 to obtain policy to associate with and/or enforce for data. In one embodiment, access policy feature 554 includes the ability to generate policy. In one embodiment, access policy feature 554 includes the ability access a remote policy service to obtain the policy. Access policy feature 554 may include the ability to locally store or cache the obtained policy for data. Policy may be obtained from a network location each time an action related to security management occurs for data.

Assign policy feature 556 enables management engine 550 to associate a security policy with data. For example, security capability manager 500 may include an XML generator within assign policy feature 556. Assign policy feature 556 may also include a generator for other types of metadata files. Assign policy feature 556 may operate in conjunction with determine data type feature 552, to provide classification of data types. The policy assigned or associated with data can be based in whole or in part on a data classification determined.

Apply policy feature 558 enables management engine 550 to enforce policy associated with data. Apply policy feature 558 may thus enable security capability manager 500 to restrict access or limit controls by a requesting user over data (e.g., viewing, copying, printing). Apply policy feature 558 may interface with an external application that operates in the context of the host operating system to enforce security policy.

Verify ID feature 560 enables management engine 550 to perform non-repudiation verification on a requesting user. Non-repudiation may include the signing of data with a digital signature. Verify ID feature 560 may thus determine whether data has a valid digital signature. A valid digital signature indicates to the recipient that the data is from the signing source. Thus, if data is generated and signed, the data can be sent to another entity that can verify the source of the data based on the digital signature. In one embodiment, security capability manager 500 refuses to modify or create data without a certification by a requesting user of the user's identity.

Access data feature 562 enables management engine 550 to monitor or receive requests, and/or access data. Access data feature 562 enables security capability manager 500 to determine when a data request is made for data under a host operating system of a platform of which security capability manager 500 is a part. Monitoring refers to the ability to determine when data that is subject to a security policy or should be subject to a security policy is to be operated on. The data may be flagged or marked, which may occur within a memory manager or file manager. Accessing the data may refer to the ability of security capability manager 500 to obtain the data itself and/or information about the data.

Manager 500 may include hardware, software, and/or a combination of these. In a case where manager 500 or its constituent components includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.) The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above.

Figure 6:
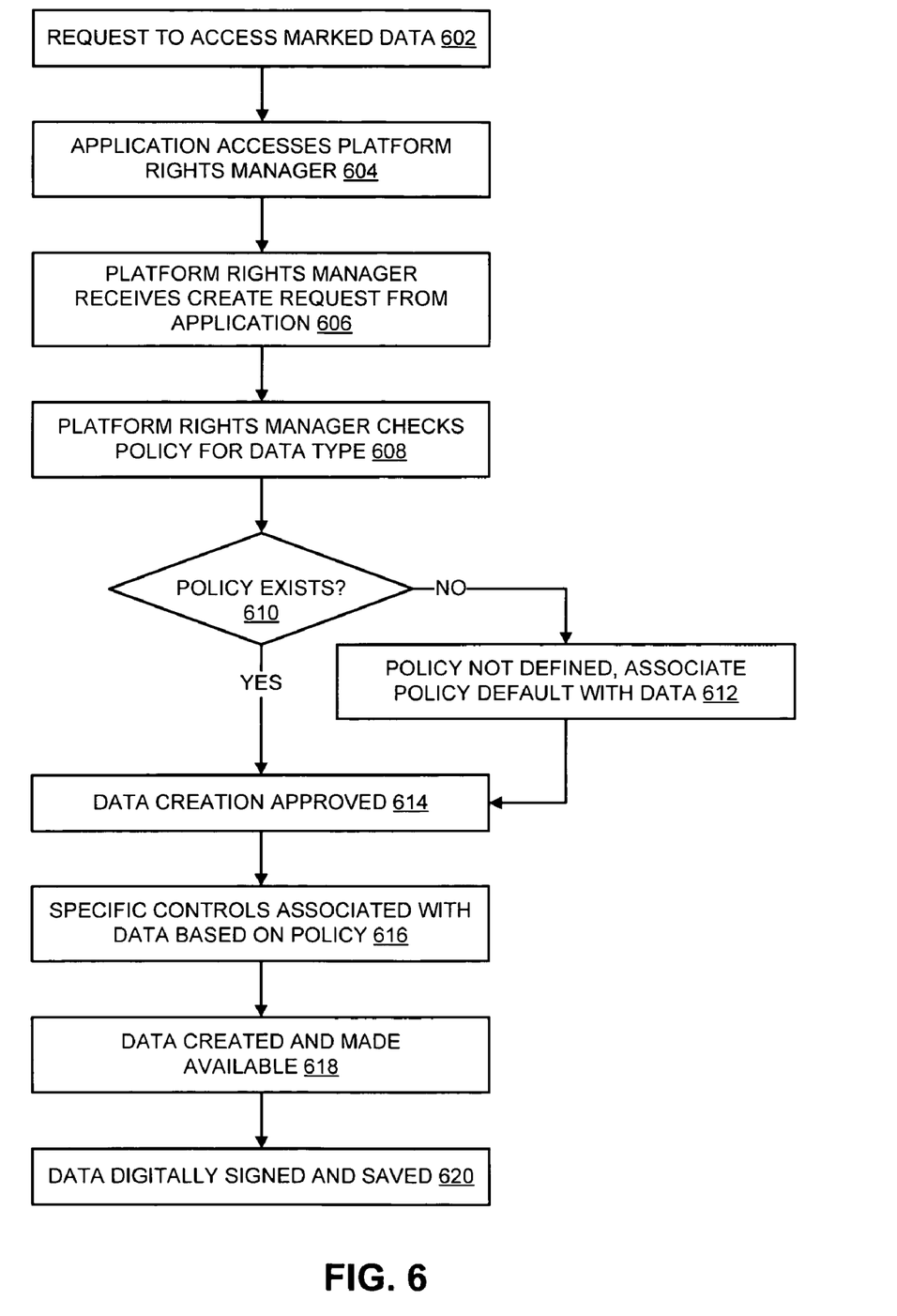
FIG. 6 is a flow diagram of an embodiment of document creation.

FIG. 6 is a flow diagram of an embodiment of document creation. A request is made to access marked data, 602. Requests are described previously. Accessing data refers to creating, modifying, or other loading and use of data. Marked data refers to data that has a security indicator. A security indicator refers to metadata or a data header or other mechanism to flag the data as having being subject to security policy. An application accessing the data can then perform operations based on the fact that the data is subject to security. The indicator may be placed with the data at time of creation of the data, or after creation of the data. The indicator may be generated by the data creator, or be added to the data by a system administrator or security module. In one embodiment, a security module performs a semantic search on data at time of creation to determine if the data should be subject to a security policy. For example, the security policy may use a mechanism the same or similar to smart tags in documents to determine that a key word or phrase appears in data.

A request is made in the context of an application under a host operating system. The application accesses a platform rights manager when marked data is accessed or created, 604. The platform rights manager refers to an application within the operating system that handles security, or to a security module as described herein, or both. The platform rights manager receives a create request from the application for new data to be created, 606. The platform rights manager checks a security policy for a data type of the data, 608. The security policy may be local or remote, as described herein, and the types of data are also described previously. To check the security policy for the data type may include determining a data type of the data, which may be relatively simple if it is already known or indicated, or may involve certain operations by the platform rights manager if it is not.

If a policy does not exist for creation of data according to the data type, 610, the policy is not defined, and a policy default is associated with the data, 612. The policy default may be selectable based on the data type. If a policy does exist, 610, the data creation is approved, 614. Data creation is also approved once the data has a policy associated with it from 612. The security policy has specific controls associated with the data, 616. The controls affect how the data can be used or accessed. The data is created and made available, 618. Creation and making available can include the registering of the data with a memory manager or with a storage table (e.g., assigning a file name). Note that data can be considered to be created and made available prior to the saving of the data with a specific reference or file name. In one embodiment, non-repudiation is employed, and the created data is digitally signed and saved, 620.

Figure 7:
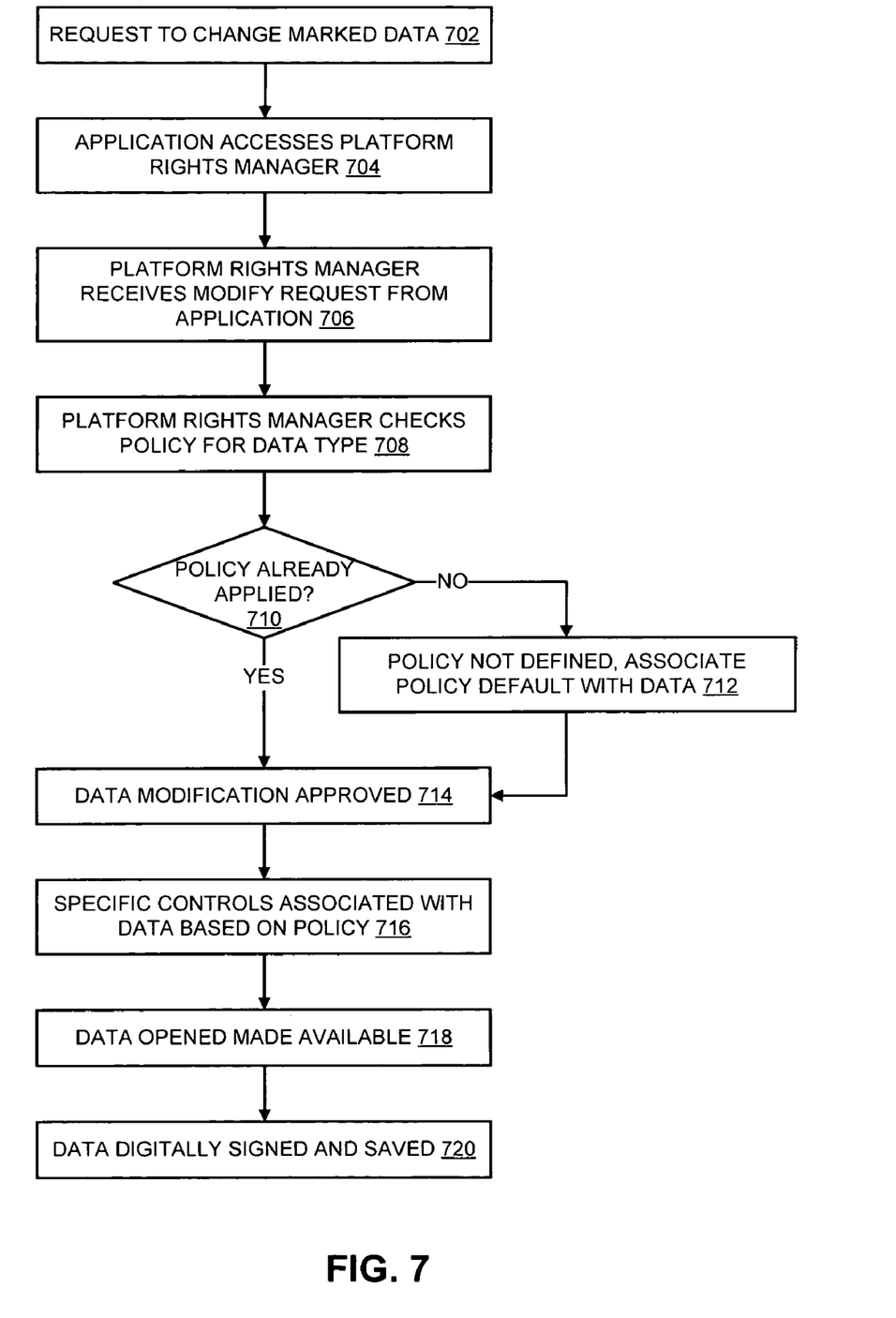
FIG. 7 is a flow diagram of an embodiment of document modification.

FIG. 7 is a flow diagram of an embodiment of document modification. Note there are many similarities between the flow described with reference to document modification of FIG. 7 as with the document creation of FIG. 6. In one embodiment, the processes may be identical except for the differences shown. A request is made to change marked data, 702. The application providing the context for the request accesses a platform rights manager when marked data is to be changed, 704. The platform rights manager receives a modify request from the application, 706. The platform rights manager checks a security policy for a data type of the data, 708.

If a policy has not already been applied to the data, 710, the policy is not defined, and a policy default is associated with the data, 712. Note that retroactive application of policy to already existing data is possible with deployment of a security module as described herein. Data can be evaluated each time it is accessed or modified to determine if a policy exists for the data. Additionally, determining if the policy has already been applied can include determining if a most recent policy is applied to the data. If the most recent policy is not applied to the data, rather than associating a default policy, the policy can simply be updated. Thus, data can be kept current with the security module described herein. The policy default or the updated policy can be selectable based on the data type. If a policy has already been applied, and potentially if up to date, 710, the data modification is approved, 714. Data modification is also approved once the data has a policy associated with it from 712. The security policy has specific controls associated with the data, 716. The controls affect how the data can be used or accessed. The data is opened and made available, 718. In one embodiment, non-repudiation is employed, and the created data is digitally signed and saved, 720.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer implemented method for data security management comprising:
   receiving a security policy at a security module of a platform via an out-of-band communication channel not accessible by an operating system ("OS") of the platform;
   managing the received security policy by the security module, including storing the received security policy in an isolated storage not directly accessible by the OS;
   the security module receiving a request for data of the platform from an application of the platform operating in a context of the OS; and
   the security module implementing the security policy, including in response to the received request,
      classifying the data to determine a data type,
      identifying that the security policy applies to the determined data type, and
      in response to the identifying, the security module storing an indication that the security policy is associated with the data to provide security controls for the data, wherein the storing the indication is performed independent of the OS.

2. The computer implemented method of claim 1, wherein the request for data comprises a request to modify existing data.

3. The computer implemented method of claim 1, wherein the request for data comprises a request to store newly created data.

4. The computer implemented method of claim 2, wherein associating the security policy with the data further comprises automatically assigning a security policy to the newly created data.

5. The computer implemented method of claim 1, wherein the security policy comprises digital rights management (DRM) of data shared across a network.

6. The computer implemented method of claim 1, wherein classifying the data comprises identifying the data type based on at least one of a file type, a document type, or a purpose of the data.

7. The computer implemented method of claim 1, wherein classifying the data comprises identifying the data type based on at least one of an identity of a user requesting the data, a geographic location of the platform, a virtual location of the platform on a network, or a length of an encryption key used to encrypt the data.

8. The computer implemented method of claim 1, wherein classifying the data comprises identifying the data type based on a semantic search of the data.

9. The computer implemented method of claim 8, wherein the semantic search of the data comprises searching the data for specified key words.

10. The computer implemented method of claim 1, wherein identifying that the security policy applies to the determined data type comprises identifying a default security policy for the type of the data.

11. The computer implemented method of claim 1, further comprising signing the data with a digital certificate to verify the identity of a requesting user to the security module.

12. An article of manufacture comprising a machine accessible medium having content stored thereon to provide instructions cause a machine to perform operations including:
    receiving a security policy at a security module of a platform via an out-of-band communication channel not accessible by an operating system ("OS") of the platform;
    managing the received security policy by the security module, including storing the received security policy in an isolated storage not directly accessible by the OS;
    receiving at the security module a request for data of the platform from an application of the platform operating in a context of the OS; and
    in response to the received request for the data,
       classifying a type of the data,
       selecting a security policy to associate with the data based at least in part on the classification of the type of the data, and
       in response to the selecting, the security module storing an indication that the selected security policy is associated with the data to provide security controls for the data, wherein the storing the indication is performed independent of the OS.

13. The article of manufacture of claim 12, the content further comprising instructions for:
    based on the stored indication, enforcing the selected security policy within the context of the operating system via the operating system independent security module.

14. The article of manufacture of claim 13, wherein enforcing the selected security policy via the security module comprises instructions for restricting at least one of copying, printing, or saving the data.

15. The article of manufacture of claim 12, wherein instructions for associating the selected security policy with the data comprises instructions for:
    generating an extensible markup language (XML) file indicating the security policy; and
    associating the XML file with the data.

16. The article of manufacture of claim 15, wherein instructions for generating an extensible markup language (XML) file indicating the security policy comprises instructions for indicating a storage location of rules of the security policy.

17. A system for managing data security comprising:
- a host processor to execute a host operating system and an application with which to generate a request for data;
- a security capability manager coupled to the host processor and outside the context of the host operating system to monitor the host processor for the request for the data, determine a security policy to associate with the data in response to the request based at least in part on a type of the data, and store, in response to the determining, an indication that the determined security policy is associated with the data to provide security controls for the data, wherein the storing the indication is performed independent of the host operating system; and
- an isolated non-volatile storage coupled to the security capability manager to store the security policy, wherein the isolated non-volatile storage is not directly accessible by the operating system.

18. The system of claim 17, the isolated non-volatile storage further to receive the security policy via a secure out-of-band communication channel not accessible by the operating system.

19. The system of claim 17, the isolated non-volatile storage to selectively store the security policy based at least in part on the type of the data.

* * * * *